US012762547B2

(12) United States Patent
Suh et al.

(10) Patent No.: US 12,762,547 B2
(45) Date of Patent: Oct. 13, 2026

(54) DATA ACQUISITION METHOD AND APPARATUS FOR ANALYZING CRYPTOCURRENCY TRANSACTION

(71) Applicant: S2W INC., Seongnam-si (KR)

(72) Inventors: Sang Duk Suh, Seongnam-si (KR); Changhoon Yoon, Seongnam-si (KR); Seung Hyeon Lee, Daejeon (KR)

(73) Assignee: S2W INC., Seongnam-si (KR)

( * ) Notice: Subject to any disclaimer, the term of this patent is extended or adjusted under 35 U.S.C. 154(b) by 720 days.

(21) Appl. No.: 17/640,660

(22) PCT Filed: Jan. 30, 2020

(86) PCT No.: PCT/KR2020/001400

§ 371 (c)(1),
(2) Date: Mar. 4, 2022

(87) PCT Pub. No.: WO2021/045332

PCT Pub. Date: Mar. 11, 2021

(65) Prior Publication Data

US 2022/0358493 A1 Nov. 10, 2022

(30) Foreign Application Priority Data

Sep. 5, 2019 (KR) ........................ 10-2019-0110111

(51) Int. Cl.
*G06Q 20/38* (2012.01)
*G06F 40/279* (2020.01)
*G06Q 20/06* (2012.01)

(52) U.S. Cl.
CPC ......... *G06Q 20/382* (2013.01); *G06F 40/279* (2020.01); *G06Q 20/065* (2013.01); *G06Q 2220/00* (2013.01)

(58) Field of Classification Search
CPC ............. G06Q 2220/00; G06Q 20/065; G06Q 20/382; G06F 40/279
See application file for complete search history.

(56) References Cited

U.S. PATENT DOCUMENTS 8,131,735 B2 * 3/2012 Rose ..................... G06F 16/313 707/750
9,276,956 B2 * 3/2016 Geng ..................... G06F 21/55
(Continued)

FOREIGN PATENT DOCUMENTS

CN 101794308 A * 8/2010
JP 2007-219880 A 8/2007
(Continued)

OTHER PUBLICATIONS

International Search Report for PCT/KR2020/001400 dated May 28, 2020.

(Continued)

*Primary Examiner* — Davida Lee King
(74) *Attorney, Agent, or Firm* — USX IP LLC

(57) ABSTRACT

The present disclosure relates to a method and apparatus for acquiring learning data to generate a machine learning model for detecting a scam account of cryptocurrency. The method comprises receiving a report related to a scam address from a first database having information about a reported scam address stored therein, acquiring a first scam address and a first description related to the first scam address from the report, extracting a plurality of first keywords related to the first scam address from the first description using natural language processing, and storing the first scam address in a second database.

8 Claims, 5 Drawing Sheets

(56) References Cited

U.S. PATENT DOCUMENTS

| | | | | |
|---|---|---|---|---|
| 9,515,984 | B1 | 12/2016 | Griggs et al. | |
| 2008/0222002 | A1 | 9/2008 | Hu et al. | |
| 2015/0200963 | A1 | 7/2015 | Geng et al. | |
| 2017/0251006 | A1* | 8/2017 | LaRosa | H04L 63/1441 |
| 2018/0124110 | A1 | 5/2018 | Hunt et al. | |
| 2019/0132357 | A1 | 5/2019 | Damian | |
| 2020/0402061 | A1* | 12/2020 | Ludwig | G06Q 20/4014 |

FOREIGN PATENT DOCUMENTS

| | | | | |
|---|---|---|---|---|
| KR | 10-2013-0096565 | A | 8/2013 | |
| WO | WO-2019106659 | A1 * | 6/2019 | G06Q 40/00 |

OTHER PUBLICATIONS

Written Opinion for PCT/KR2020/001400 dated May 28, 2020.

Office Action issued Jun. 13, 2023 in Japanese Application No. 2022-512809.

* cited by examiner

DATA ACQUISITION METHOD AND APPARATUS FOR ANALYZING CRYPTOCURRENCY TRANSACTION

CROSS REFERENCE TO RELATED APPLICATIONS

This application is a National Stage of International Application No. PCT/KR2020/001400 filed Jan. 30, 2020, claiming priority based on Korean Patent Application No. 10-2019-0110111 filed Sep. 5, 2019.

TECHNICAL FIELD

The present disclosure relates to a method and apparatus for acquiring learning data to generate a machine learning model for detecting a scam account of cryptocurrency.

BACKGROUND ART

Cryptocurrency is a digital asset designed to function as exchange means, and refers to electronic information that is encrypted with blockchain technology, is distributed and issued, and can be used as currency in a certain network. Cryptocurrency is not issued by a central bank, but is electronic information, a monetary value of which is digitally displayed on the basis of blockchain technology, is distributed, stored, operated, and managed in a P2P manner on the Internet. The core technique for issuing and managing cryptocurrency is blockchain technology. The blockchain is a list of records (blocks) that are continuously increasing, and blocks are connected using an encryption method to ensure security. Each block typically includes a crypto hash, a timestamp, and transaction data. The blockchain has resistance to data modification from the beginning, and is an open distributed ledger that can permanently and validly prove transactions between two parties. Accordingly, cryptocurrency enables transparent operation based on anti-tampering.

In addition, cryptocurrency has anonymity, unlike the existing currency, so that third parties other than a transmitter and a receiver cannot know the transaction details at all. Due to the anonymity of the account, it is difficult to track the flow of transactions (non-trackable), and although all records such as remittance records and collection records are publicly available, the subject of the transaction cannot be known.

Cryptocurrency is considered as an alternative to the existing key currency due to aforementioned freedom and transparency, and is expected to be effectively used for international transactions and the like with lower fees and simple remittance procedures compared to the existing currency. However, due to the anonymity, cryptocurrency is sometimes used as a means of crime, such as being used for scam transactions.

Meanwhile, there is a problem in that it is difficult to determine the scam subject by manually discerning the features of the scam transaction due to the massive amount of data of the cryptocurrency transaction. In this regard, machine learning can automatically learn relationships between massive amounts of data.

Accordingly, there is a need for a method to identify the transaction subject who uses cryptocurrency as criminal means using machine learning.

SUMMARY OF INVENTION

Solution to Problem

A method for acquiring learning data to generate a machine learning model for detecting a scam account of cryptocurrency according to present disclosure comprises: receiving a report related to a scam address from a first database having information about a reported scam address stored therein; acquiring a first scam address and a first description related to the first scam address from the report; extracting a plurality of first keywords related to the first scam address from the first description using natural language processing; and storing the first scam address in a second database.

The method for acquiring learning data according to the present disclosure comprises: receiving text information from a publicly accessible website; extracting main text information including a cryptocurrency address from the text information; extracting a plurality of second keywords from the main text information using natural language processing; acquiring a scam information detection model; determining whether or not the cryptocurrency address included in the main text is a scam address by applying the plurality of second keywords to the scam information detection model; acquiring, when the cryptocurrency address is a scam address, the cryptocurrency address as a second scam address; and storing the second scam address in the second database.

The step of acquiring a scam information detection model in the method for acquiring learning data according to the present disclosure comprises: acquiring words related to a benign cryptocurrency address acquired from a website determined as including the benign cryptocurrency address; acquiring a first frequency with which each of words related to the benign cryptocurrency address appears on a website; acquiring a second frequency with which each of the first keywords appears in the first description; and acquiring the scam information detection model by machine learning of the words related to the benign cryptocurrency address labeled as benign, the first frequency, the second frequency, and the plurality of first keywords labeled as scam.

The method for acquiring learning data according to present disclosure comprises: acquiring a second description from a service providing a tag corresponding to a cryptocurrency address; acquiring a scam keyword set on the basis of the plurality of first keywords; determining, when a word included in the scam keyword set is described in the second description, a cryptocurrency address corresponding to the second description as a third scam address; and storing the third scam address in the second database.

The step of acquiring a scam keyword set in the method for acquiring learning data according to present disclosure comprises: acquiring a frequency of appearance in the first description for each of the plurality of first keywords; and determining a predetermined number of words with a high frequency among the plurality of first keywords as the scam keyword set.

The method for acquiring learning data according to present disclosure further comprises: acquiring score information representing reliability of an address from a service providing a tag corresponding to the cryptocurrency address; determining the cryptocurrency address as a benign address, when the score information represents benign reliability and a word included in the scam keyword set is not included in the second description; determining the cryptocurrency address as the third scam address, when the score information represents scam and a word included in the scam keyword set is included in the second description; and storing the benign address and the third scam address in the second database.

An apparatus for acquiring learning data to generate a machine learning model for detecting a scam account of cryptocurrency according to the present disclosure includes a processor and a memory, and the processor executes: according to commands stored in the memory, receiving a report related to a scam address from a first database having information about a reported scam address stored therein; acquiring a first scam address and a first description related to the first scam address from the report; extracting a plurality of first keywords related to the first scam address from the first description using natural language processing; and storing the first scam address in a second database.

The processor of the apparatus for acquiring learning data according to the present disclosure executes: according to commands stored in the memory, receiving text information from a publicly accessible website; extracting main text information including a cryptocurrency address from the text information; extracting a plurality of second keywords from the main text information using natural language processing; acquiring a scam information detection model; determining whether or not the cryptocurrency address included in the main text is a scam address by applying the plurality of second keywords to the scam information detection model; acquiring, when the cryptocurrency address is a scam address, the cryptocurrency address as a second scam address; and storing the second scam address in the second database.

The processor of the apparatus for acquiring learning data according to the present disclosure executes: according to commands stored in the memory, acquiring words related to a benign cryptocurrency address acquired from a website determined as including the benign cryptocurrency address; acquiring a first frequency with which each of words related to the benign cryptocurrency address appears on a website; acquiring a second frequency with which each of the first keywords appears in the first description; and acquiring the scam information detection model by machine learning of the words related to the benign cryptocurrency address labeled as benign, the first frequency, the second frequency, and the plurality of first keywords labeled as scam.

The processor of the apparatus for acquiring learning data according to the present disclosure executes: according to commands stored in the memory, acquiring a second description from a service providing a tag corresponding to a cryptocurrency address; acquiring a scam keyword set on the basis of the plurality of first keywords; determining, when a word included in the scam keyword set is described in the second description, a cryptocurrency address corresponding to the second description as a third scam address; and storing the third scam address in the second database.

The processor of the apparatus for acquiring learning data according to the present disclosure executes: according to commands stored in the memory, acquiring a frequency of appearance in the first description for each of the plurality of first keywords; and determining a predetermined number of words with a high frequency among the plurality of first keywords as the scam keyword set.

The processor of the apparatus for acquiring learning data according to the present disclosure further executes: according to commands stored in the memory, acquiring score information representing reliability of an address from a service providing a tag corresponding to the cryptocurrency address; determining the cryptocurrency address as a benign address, when the score information represents benign reliability and a word included in the scam keyword set is not included in the second description; determining the cryptocurrency address as the third scam address, when the score information represents scam and a word included in the scam keyword set is included in the second description; and storing the benign address and the third scam address in the second database.

In addition, a program for executing the method for acquiring learning data described above may be recorded in a computer-readable recording medium.

DESCRIPTION OF EMBODIMENTS

Figure 1:
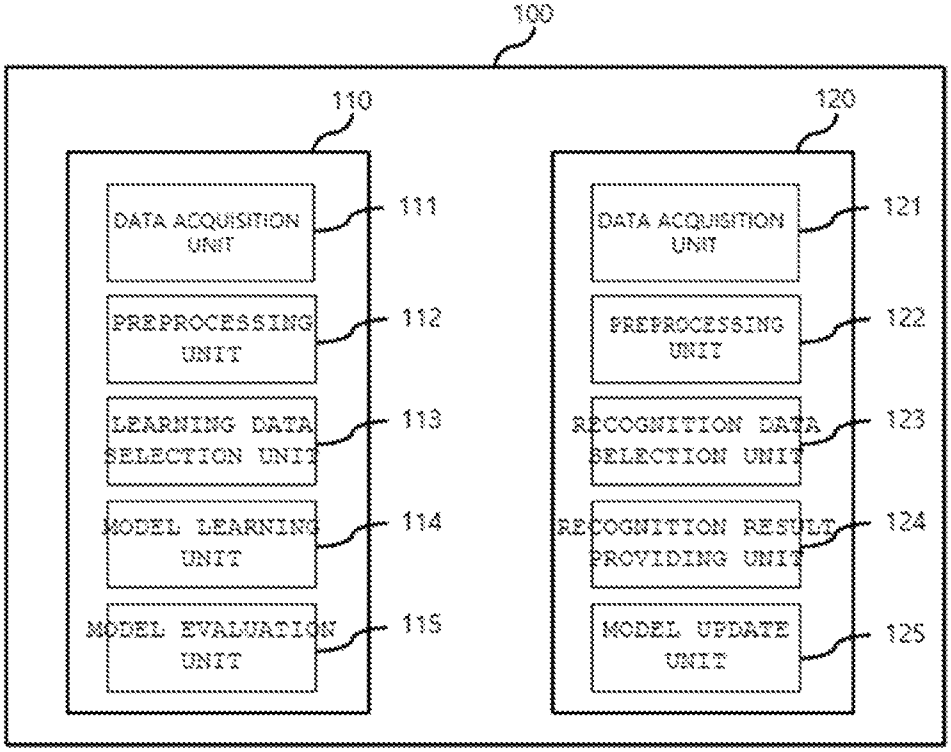
FIG. 1 is a block diagram of a learning data acquisition apparatus according to an embodiment of the present disclosure.

Advantages and features of the disclosed embodiments, and methods of achieving them, will become apparent with reference to the embodiments described below in conjunction with the accompanying drawings. However, the present disclosure is not limited to the embodiments disclosed below, but may be implemented in various different forms, and only the present embodiments allow the present disclosure to be complete and are only provided to those of ordinary skill in the art to which the present disclosure pertains to fully inform the person of the scope of the invention.

Terms used in the specification will be briefly described, and the disclosed embodiments will be described in detail.

The terms used in this specification have been selected as currently widely used general terms as possible while considering the functions in the present disclosure, but these may vary depending on the intention or precedent of a person skilled in the art, the emergence of new technology, and the like. In addition, in a specific case, there is a term arbitrarily selected by the applicant, and in this case, the meaning will be described in detail in the corresponding description of the invention. Therefore, the terms used in the present disclosure should be defined based on the meaning of the term and the contents of the present disclosure, rather than the simple name of the term.

Singular expressions in the specification include plural expressions unless the context clearly specifies the singular. Also, plural expressions include singular expressions unless the context clearly specifies the plural.

In the entire specification, when a part "includes" a certain element, this means that the part further includes other elements, rather than excluding other elements, unless otherwise stated particularly.

Also, as used in the specification, the term "unit" refers to a software or hardware element, and a "unit" performs certain roles. However, a "unit" is not meant to be limited to software or hardware. The "unit" may be configured to be on an addressable storage medium and may be configured to reproduce one or more processors. Thus, by way of example, a "unit" includes elements such as software elements, object-oriented software elements, class elements, and task elements, processes, functions, properties, procedures, subroutines, segments of program code, drivers, firmware, microcode, circuitry, data, databases, data structures, tables, arrays, and variables. The functionality provided within elements and "units" may be combined into a smaller number of elements and "units" or further divided into additional elements and "units".

According to an embodiment of the present disclosure, a "unit" may be implemented by a processor and a memory. The term "processor" should be interpreted broadly to include a general purpose processor, a central processing unit (CPU), a microprocessor, a digital signal processor (DSP), a controller, a microcontroller, a state machine, and the like. In some circumstances, a "processor" may refer to an application specific semiconductor (ASIC), a programmable logic device (PLD), a field programmable gate array (FPGA), or the like. The term "processor" may refer to a combination of processing devices, such as, for example, a combination of a DSP and a microprocessor, a combination of a plurality of microprocessors, a combination of one or more microprocessors in combination with a DSP core, or any other such configurations.

The term "memory" should be interpreted broadly to include any electronic component capable of storing electronic information. The term "memory" may refer to various types of processor-readable media such as a random access memory (RAM), a read-only memory (ROM), a non-volatile random access memory (NVRAM), a programmable read-only memory (PROM), an erase-programmable read only memory (EPROM), an electrical erasable PROM (EEPROM), a flash memory, a magnetic or optical data storage device, and registers. A memory is said to be in electronic communication with the processor if the processor is capable of reading information from and/or writing information to the memory. A memory integrated in the processor is in electronic communication with the processor.

Hereinafter, with reference to the accompanying drawings, embodiments will be described in detail so that those of ordinary skill in the art to which the present disclosure pertains can easily implement them. In order to clearly describe the present disclosure in the drawings, parts not related to the description will be omitted.

FIG. 1 is a block diagram of a learning data acquisition apparatus 100 according to an embodiment of the present disclosure.

Referring to FIG. 1, the learning data acquisition apparatus 100 according to an embodiment may include at least one of a data learning unit 110 and a data recognition unit 120. The learning data acquisition apparatus 100 as described above may include a processor and a memory.

The data learning unit 110 may learn a machine learning model for performing a target task using a data set. The data learning unit 110 may receive a data set and label information related to a target task. The data learning unit 110 may acquire a machine learning model by performing machine learning on the relationship between the data set and the label information. The machine learning model which the data learning unit 110 acquires may be a model for generating label information using a data set.

The data recognition unit 120 may receive and store the machine learning model of the data learning unit 110. The data recognition unit 120 may output the label information by applying the machine learning model to input data. In addition, the data recognition unit 120 may use the input data, the label information, and the result output by the machine learning model to update the machine learning model.

At least one of the data learning unit 110 and the data recognition unit 120 may be manufactured in the form of at least one hardware chip and mounted in an electronic device. For example, at least one of the data learning unit 110 and the data recognition unit 120 may be manufactured in the form of a dedicated hardware chip for artificial intelligence (AI), or may be manufactured as a part of an existing general-purpose processor (e.g., CPU or application processor) or a dedicated graphics processor (e.g., GPU) and mounted in various kinds of electronic devices described already.

In addition, the data learning unit 110 and the data recognition unit 120 may be mounted in separate electronic devices, respectively. For example, one of the data learning unit 110 and the data recognition unit 120 may be included in an electronic device, and the other may be included in a server. In addition, the data learning unit 110 and the data recognition unit 120 may provide the machine learning model information built by the data learning unit 110 to the data recognition unit 120 by wire or wireless, and the data input to the data recognition unit 120 may be provided as additional learning data to the data learning unit 110.

Meanwhile, at least one of the data learning unit 110 and the data recognition unit 120 may be implemented as a software module. When at least one of the data learning unit 110 and the data recognition unit 120 is implemented as a software module (or a program module including instructions), the software module may be stored in a memory or a non-transitory computer-readable medium. In this case, at least one software module may be provided by an OS (operating system), or provided by a predetermined application. Alternatively, a part of at least one software module may be provided by an OS (operating system), and the other may be provided by a predetermined application.

The data learning unit 110 according to an embodiment of the present disclosure may include a data acquisition unit 111, a preprocessing unit 112, a learning data selection unit 113, a model learning unit 114, and a model evaluation unit 115.

The data acquisition unit 111 may acquire data necessary for machine learning. Since a lot of data is required for learning, the data acquisition unit 111 may receive a data set including a plurality of data.

Label information may be assigned to each of the plurality of data. The label information may be information describing each of the plurality of data. The label information may be information that a target task wants to derive. The label information may be acquired from a user input, may be acquired from a memory, or may be acquired from a result of machine learning model. For example, if the target task is to determine from a transaction history of a cryptocurrency address whether the cryptocurrency address is an address owned by a scammer, a plurality of data used for machine learning may be data related to the transaction history of the cryptocurrency address, and label information may be whether the cryptocurrency address is an address owned by the scammer.

The preprocessing unit 112 may preprocess obtained data so as to use received data for machine learning. The preprocessing unit 112 may process an obtained data set to a preset format so that a model learning unit 114 to be described later can use the data.

The learning data selection unit 113 may select data necessary for learning from the preprocessed data. The selected data may be provided to the model learning unit 114. The learning data selection unit 113 may select data necessary for learning from the preprocessed data in accordance with a preset criterion. In addition, the learning data selection unit 113 may select data in accordance with a preset criterion by learning of the model learning unit 114 to be described later.

The model learning unit 114 may learn a criterion regarding which label information to output on the basis of the data set. In addition, the model learning unit 114 may perform machine learning using the data set and the label information about the data set as learning data. In addition, the model learning unit 114 may perform machine learning by additionally using the previously acquired machine learning model. In this case, the previously acquired machine learning model may be a previously built model. For example, the machine learning model may be a model previously built by receiving basic learning data.

The machine learning model may be built in consideration of the field of application of the learning model, the purpose of learning, the computer performance of the device, and the like. The machine learning model may be, for example, a model based on a neural network. For example, a model such as Deep Neural Network (DNN), Recurrent Neural Network (RNN), Long Short-Term Memory models (LSTM), Bidirectional Recurrent Deep Neural Network (BRDNN), Convolutional Neural Networks (CNN) may be used as a machine learning model, but the invention is not limited thereto.

According to various embodiments, when there are a plurality of previously built machine learning model, the model learning unit 114 may determine a machine learning model with a large correlation between the input learning data and the basic learning data as a machine learning model to learn. In this case, the basic learning data may be pre-classified by data type, and the machine learning model may be previously built by data type. For example, the basic learning data may be pre-classified according to various criteria such as the place where the learning data is generated, the time when the learning data is generated, the size of the learning data, the creator of the learning data, and the type of object in the learning data.

In addition, the model learning unit 114 may train the machine learning model using, for example, a learning algorithm including error back-propagation or gradient descent.

In addition, the model learning unit 114 may learn the machine learning model through, for example, supervised learning with learning data as input values. In addition, the model learning unit 114 may acquire the machine learning model through, for example, unsupervised learning to discover a criterion for a target task by learning kinds of data necessary for a target task by itself without any supervision. In addition, the model learning unit 114 may learn the machine learning model through, for example, reinforcement learning using feedback on whether a result of a target task based on learning is correct.

In addition, when the machine learning model is learned, the model learning unit 114 may store the learned machine learning model. In this case, the model learning unit 114 may store the learned machine learning model in a memory of an electronic device including the data recognition unit 120. Alternatively, the model learning unit 114 may store the learned machine learning model in a memory of a server connected to an electronic device through a wired or wireless network.

The memory in which the learned machine learning model is stored may also store, for example, commands or data related to at least one other element of an electronic device together. In addition, the memory may store software and/or program. The program may include, for example, kernel, middleware, application programming interface (API) and/or application program (or "application"), and the like.

The model evaluation unit 115 inputs evaluation data to the machine learning model, and may allow the model learning unit 114 to learn again when a result output from the evaluation data does not satisfy a predetermined criterion. In this case, the evaluation data may be a preset data for evaluating the machine learning model.

For example, the model evaluation unit 115 may evaluate as not satisfying a predetermined criterion when, among the result of the learned machine learning model for the evaluation data, the number or ratio of evaluation data for which a recognition result is not accurate exceeds a preset threshold value. For example, when the predetermined ratio is defined as 2% and the learned machine learning model outputs incorrect recognition results for more than 20 evaluation data out of a total of 1000 evaluation data, the model evaluation unit 115 may evaluate that the learned machine learning model is not suitable.

Meanwhile, when there are a plurality of learned machine learning models, the model evaluation unit 115 evaluates whether each learned machine learning model satisfies a predetermined criterion, and may determine a model satisfying the predetermined criterion as a final machine learning model. In this case, when there are a plurality of models satisfying the predetermined criterion, the model evaluation unit 115 may determine any preset one or a predetermined number of models in order of highest evaluation score as a final machine learning model.

Meanwhile, at least one of the data acquisition unit 111, the preprocessing unit 112, the learning data selection unit 113, the model learning unit 114, and the model evaluation unit 115 in the data learning unit 110 may be manufactured in the form of at least one hardware chip and mounted in an electronic device. For example, at least one of the data acquisition unit 111, the preprocessing unit 112, the learning data selection unit 113, the model learning unit 114, and the model evaluation unit 115 may be manufactured in the form of a dedicated hardware chip for artificial intelligence (AI), or may be manufactured as a part of an existing general-purpose processor (e.g., CPU or application processor) or a dedicated graphics processor (e.g., GPU) and mounted in various kinds of electronic devices described above.

In addition, the data acquisition unit 111, the preprocessing unit 112, the learning data selection unit 113, the model learning unit 114, and the model evaluation unit 115 may be mounted in one electronic device, or mounted in separate electronic device, respectively. For example, a part of the data acquisition unit 111, the preprocessing unit 112, the learning data selection unit 113, the model learning unit 114, and the model evaluation unit 115 may be included in an electronic device, and the other may be included in a server.

In addition, at least one of the data acquisition unit 111, the preprocessing unit 112, the learning data selection unit 113, the model learning unit 114, and the model evaluation unit 115 may be implemented as a software module. When at least one of the data acquisition unit 111, the preprocessing unit 112, the learning data selection unit 113, the model learning unit 114, and the model evaluation unit 115 is implemented as a software module (or a program module including instructions), the software module may be stored in a non-transitory computer-readable medium. In this case, at least one software module may be provided by an OS (operating system), or provided by a predetermined application. Alternatively, a part of at least one software module may be provided by an OS (operating system), and the other may be provided by a predetermined application.

The data recognition unit 120 according to an embodiment of the present disclosure may include a data acquisition unit 121, a preprocessing unit 122, a recognition data selection unit 123, a recognition result providing unit 124, and a model update unit 125.

The data acquisition unit 121 may receive input data. The preprocessing unit 122 may preprocess the acquired input data so as to use the acquired input data in the recognition data selection unit 123 or the recognition result providing unit 124.

The recognition data selection unit 123 may select necessary data from preprocessed data. The selected data may be provided to the recognition result providing unit 124. The recognition data selection unit 123 may select a part or all of the preprocessed data in accordance with a preset criterion. In addition, the recognition data selection unit 123 may select data in accordance with a preset criterion by learning of the model learning unit 114.

The recognition result providing unit 124 may acquire result data by applying the selected data to a machine learning model. The machine learning model may be a machine learning model generated by the model learning unit 114. The recognition result providing unit 124 may output result data.

The model update unit 125 may update the machine learning model on the basis of evaluation about the recognition result provided by the recognition result providing unit 124. For example, the model update unit 125 may provide the recognition result provided by the recognition result providing unit 124 to the model learning unit 114 so that the model learning unit 114 updates the machine learning model.

Meanwhile, at least one of the data acquisition unit 121, the preprocessing unit 122, the recognition data selection unit 123, the recognition result providing unit 124, and the model update unit 125 in the data recognition unit 120 may be manufactured in the form of at least one hardware chip and mounted in an electronic device. For example, at least one of the data acquisition unit 121, the preprocessing unit 122, the recognition data selection unit 123, the recognition result providing unit 124, and the model update unit 125 may be manufactured in the form of a dedicated hardware chip for artificial intelligence (AI), or may be manufactured as a part of an existing general-purpose processor (e.g., CPU or application processor) or a dedicated graphics processor (e.g., GPU) and mounted in various kinds of electronic devices described above.

In addition, the data acquisition unit 121, the preprocessing unit 122, the recognition data selection unit 123, the recognition result providing unit 124, and the model update unit 125 may be mounted in one electronic device, or mounted in separate electronic device, respectively. For example, a part of the data acquisition unit 121, the preprocessing unit 122, the recognition data selection unit 123, the recognition result providing unit 124, and the model update unit 125 may be included in an electronic device, and the other may be included in a server.

In addition, at least one of the data acquisition unit 121, the preprocessing unit 122, the recognition data selection unit 123, the recognition result providing unit 124, and the model update unit 125 may be implemented as a software module. When at least one of the data acquisition unit 121, the preprocessing unit 122, the recognition data selection unit 123, the recognition result providing unit 124, and the model update unit 125 is implemented as a software module (or a program module including instructions), the software module may be stored in a non-transitory computer-readable medium. In this case, at least one software module may be provided by an OS (operating system), or provided by a predetermined application. Alternatively, a part of at least one software module may be provided by an OS (operating system), and the other may be provided by a predetermined application.

Hereinafter, a method and apparatus in which the data acquisition unit 111, the preprocessing unit 112, and the learning data selection unit 113 of the data learning unit 110 receives and processes learning data will be described in more detail.

Figure 2:
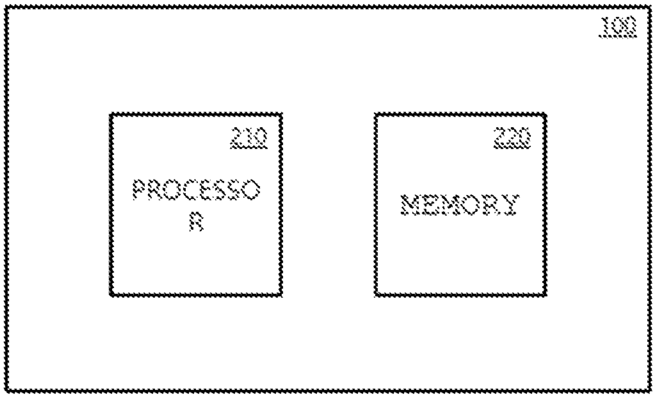
FIG. 2 is a diagram illustrating a learning data acquisition apparatus according to an embodiment of the present disclosure.

FIG. 2 is a diagram illustrating a learning data acquisition apparatus according to an embodiment of the present disclosure.

A learning data acquisition apparatus 100 may include a processor 210 and a memory 220. The processor 210 may perform commands stored in the memory 220.

As described above, the learning data acquisition apparatus 100 may include the data learning unit 110. The data acquisition unit 111, the preprocessing unit 112, or the learning data selection unit 113 of the data learning unit 110 may be implemented by the processor 210 and the memory 220.

Hereinafter, the learning data acquisition apparatus will be described in detail with reference to FIG. 3 and FIG. 4.

Figure 3:
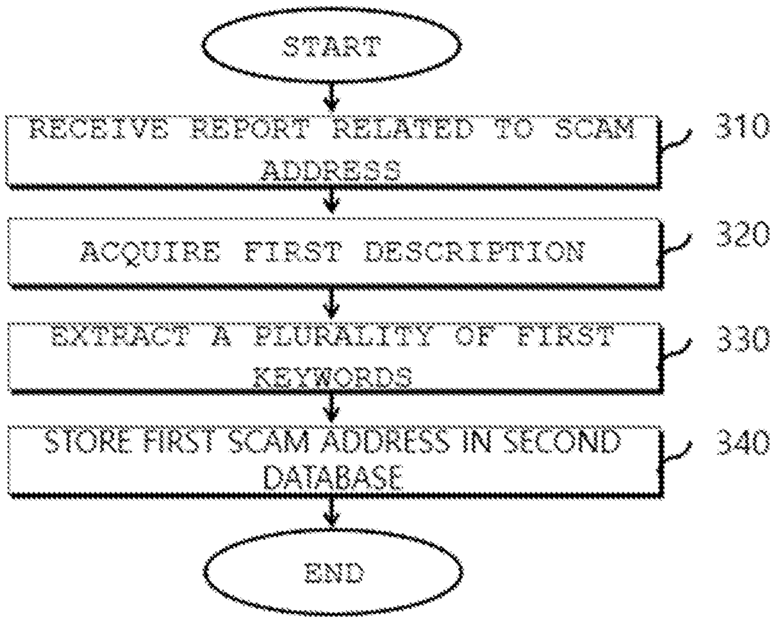
FIG. 3 is a flowchart illustrating an operation of a learning data acquisition apparatus according to an embodiment of the present disclosure.
Figure 4:
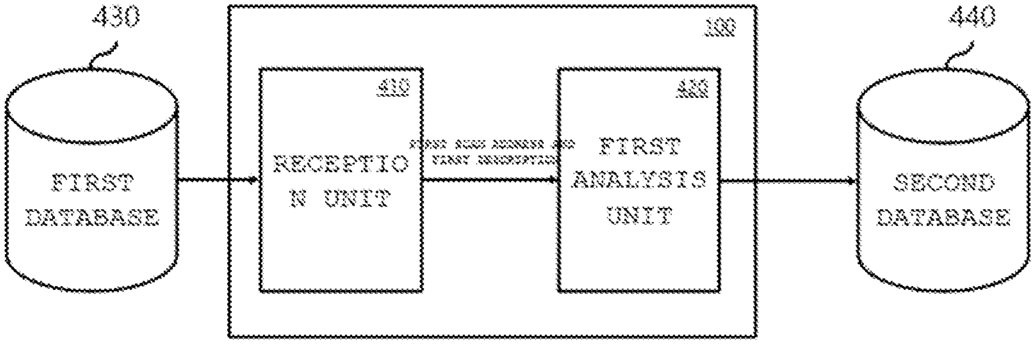
FIG. 4 is a diagram illustrating an operation of a learning data acquisition apparatus according to an embodiment of the present disclosure.

FIG. 3 is a flowchart illustrating an operation of a learning data acquisition apparatus according to an embodiment of the present disclosure. In addition, FIG. 4 is a diagram illustrating an operation of a learning data acquisition apparatus according to an embodiment of the present disclosure.

The learning data acquisition apparatus 100 may acquire learning data for generating a machine learning model for detecting a scam account. The learning data acquisition apparatus 100 may include a data acquisition unit 111, a preprocessing unit 112, or a learning data selection unit 113.

The learning data acquisition apparatus 100 may execute Step 310 of receiving a report related to scam addresses from a first database having information about reported scam addresses stored therein.

The learning data acquisition apparatus 100 may further include a reception unit 410 for receiving data from the first database 430. The reception unit 410 may receive data by wire or wireless.

The first database 430 may be a database built in a service providing a report related to scam addresses of cryptocurrency. In addition, the first database 430 may be a database built in Bitcoin scam blacklist services. For example, a service providing a report related to scam addresses may be a service such as BitcoinWhosWho or BitcoinAbuse. The first database 430 stores a report for each cryptocurrency address. The learning data acquisition apparatus 100 may receive the report. The learning data acquisition apparatus 100 may determine whether a cryptocurrency address is a scam address on the basis of the report.

The learning data acquisition apparatus 100 may execute Step 320 of acquiring a first scam address and a first description related to the first scam address from the report.

The learning data acquisition apparatus 100 may further include a first analysis unit 420 for acquiring and processing the first scam address and the first description related to the first scam address. The first analysis unit may analyze the data received from the first database. The first analysis unit 420 may be implemented as software or hardware. The first analysis unit 420 processes data different from that of a second analysis unit or a third analysis unit, but may be implemented by the same hardware.

The first scam address may be an address to and from which cryptocurrency is transmitted and received. The first scam address may be an address determined as a cryptocurrency address already used for scam by a service including the first database 430. The first description may describe in text why the first scam address is determined as a scam address.

The learning data acquisition apparatus 100 may use only the first description written in a specific language. Since the first description is written in natural language, if the learning data acquisition apparatus 100 does not properly analyze the language, the accuracy of the analysis of the scam address may be decreased. Accordingly, the learning data acquisition apparatus 100 may use only the first description written in analyzable language. However, the invention is not limited thereto.

The learning data acquisition apparatus 100 may execute Step 330 of extracting a plurality of first keywords related to the first scam address from the first description using natural language processing. The Bitcoin scam blacklist service including the first database may be a service with high reliability in relation to the identification of a scam address. Accordingly, the learning data acquisition apparatus 100 may derive the first keywords from the text of the first description and analyze information related to an address of cryptocurrency acquired from another database.

The learning data acquisition apparatus 100 may delete characters unnecessary for analysis such as special characters, URLs, and stopwords from the first description. In addition, when the number of words remaining after deleting unnecessary characters from the first description is less than a predetermined number, the learning data acquisition apparatus 100 may not use the corresponding first description. The predetermined number may be, for example, 15. When the remaining words is less than the predetermined number, the number of words may be too small to be inappropriate to use the words as keywords for determining a scam address. The learning data acquisition apparatus 100 may increase reliability of the learning data apparatus 100 by using a predetermined number or more of first descriptions after deleting unnecessary characters. In addition, the reliability of the machine learning model based on the data acquired by the learning data acquisition apparatus 100 may be increased.

The learning data acquisition apparatus 100 may execute Step 340 of storing the first scam address in a second database 440. The second database 440 may be included in the learning data acquisition apparatus 100. The second database 440 may store data for generating a machine learning model. In addition, the second database 440 may store data for discerning another scam address and analyzing a description about the scam address.

Hereinafter, a method and apparatus for acquiring a scam address and information related to the scam address from data acquired from sources other than Bitcoin scam blacklist services will be described.

Figure 5:
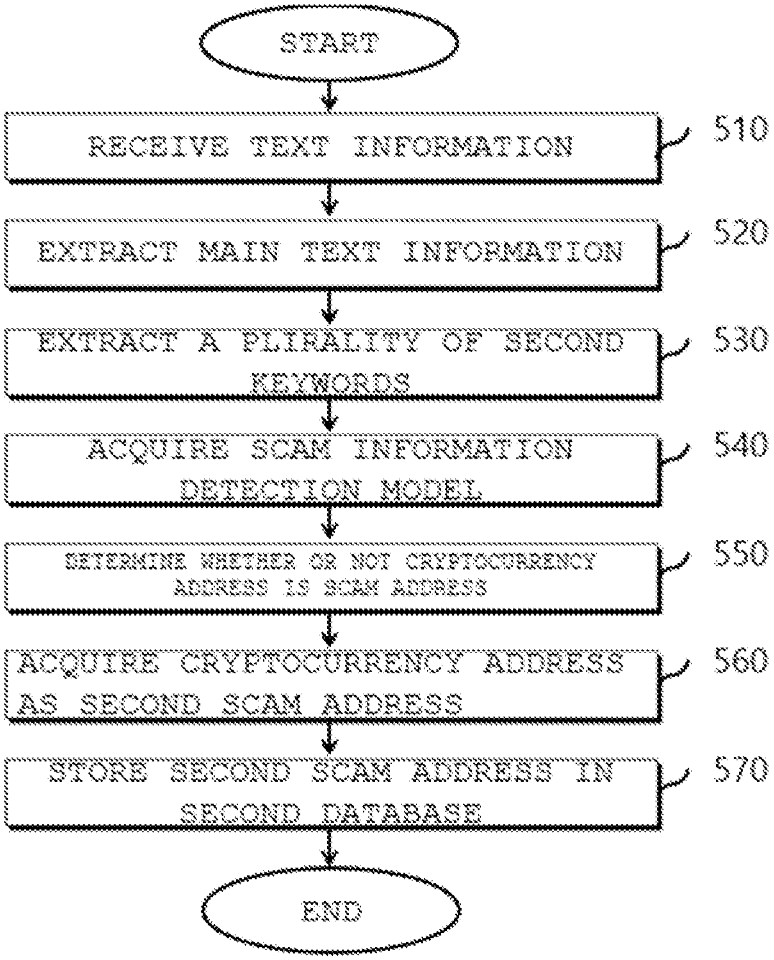
FIG. 5 is a flowchart illustrating an operation of a learning data acquisition apparatus according to an embodiment of the present disclosure.
Figure 6:
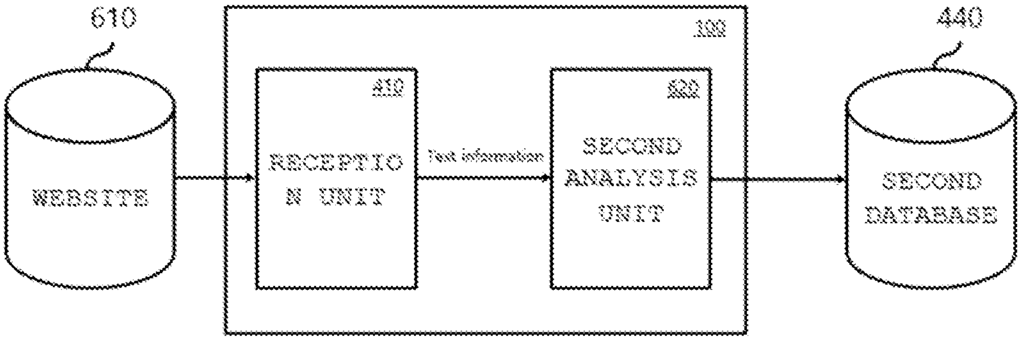
FIG. 6 is a diagram illustrating an operation of a learning data acquisition apparatus according to an embodiment of the present disclosure.

FIG. 5 is a flowchart illustrating an operation of a learning data acquisition apparatus according to an embodiment of the present disclosure. In addition, FIG. 6 is a diagram illustrating an operation of a learning data acquisition apparatus according to an embodiment of the present disclosure.

A learning data acquisition apparatus 100 may execute Step 510 of receiving text information from a publicly accessible website. The learning data acquisition apparatus 100 may receive text information from a website using a reception unit 410.

The publicly accessible website 610 may include personal or technical blogs. In addition, it may be a scam analysis report of a cyber security company. Various kinds of information related to an address of cryptocurrency may be described on the website 610. For example, the website 610 may contain that an address of specific cryptocurrency was used for scam, transaction with a specific address of cryptocurrency was satisfactory, or transaction was simply made with a specific address of cryptocurrency. The learning data acquisition apparatus 100 may execute the following steps to extract the content that a specific address of cryptocurrency among them was used for scam.

The website 610 may not have a regular form differently from the first database 430. In addition, the website 610 may include various kinds of information other than information related to scam addresses.

The learning data acquisition apparatus 100 may crawl a predetermined website 610. However, the invention is not limited thereto, and the learning data acquisition apparatus 100 may automatically extract necessary data by crawling any website 610.

A source code of the website 610 may be composed of an HTML document. The HTML document may include not only content to be displayed on the website 610, but also a code related to a format for displaying the content. The learning data acquisition apparatus 100 may extract an HTML body as text information from the website 610.

The learning data acquisition apparatus 100 may execute Step 520 of extracting main text information including a cryptocurrency address from the text information.

The learning data acquisition apparatus 100 may further include a second analysis unit 620. The second analysis unit 620 may analyze the text information received from the website 610. The second analysis unit 620 may be implemented as software or hardware. The learning data acquisition apparatus 100 may extract main text information using the second analysis unit 620.

The learning data acquisition apparatus 100 may use only a page including an address of cryptocurrency of the text information of the website 610. The address of cryptocurrency may have a specific format. Accordingly, the learning data acquisition apparatus 100 may determine whether an address of cryptocurrency is described on the page on the basis of the content of the page of the website 610. The learning data acquisition apparatus 100 may remove unnecessary information from the text information of the page including an address of cryptocurrency. For example, the learning data acquisition apparatus 100 may delete banners and HTML tags. To this end, the learning data acquisition apparatus 100 may use Boilerpipe.

The second analysis unit 620 of the learning data acquisition apparatus 100 may execute Step 530 of extracting a plurality of second keywords from the main text information using natural language processing. For example, the learning data acquisition apparatus 100 may delete characters unnecessary for analysis such as special characters, URLs, and stopwords from the main text.

The second analysis unit 620 of the learning data acquisition apparatus 100 may execute Step 540 of acquiring a scam information detection model. The scam information detection model may be a neural network classifier. The scam information detection model may be a model acquired by performing machine learning. The scam information detection model may be a machine learning model for determining whether a cryptocurrency address is used by a scammer on the basis of keywords related to an address of cryptocurrency.

The learning data acquisition apparatus 100 may directly generate a scam information detection model. The learning data acquisition apparatus 100 may include a data learning unit 110 to generate a scam information detection model. In addition, the learning data acquisition apparatus 100 may receive a scam information detection model from another device. A process in which the learning data acquisition apparatus 100 generates a scam information detection model will be described in detail with reference to FIG. 7.

The second analysis unit 620 of the learning data acquisition apparatus 100 may execute Step 550 of determining whether a cryptocurrency address included in the main text is a scam address by applying a plurality of second keywords to the scam information detection model. More specifically, the learning data acquisition apparatus 100 may derive a frequency with which each of the plurality of second keywords appears in main text. The learning data acquisition apparatus 100 may apply the plurality of second keywords and the frequency to the scam information detection model. The learning data acquisition apparatus 100 may acquire information on whether the cryptocurrency address included in the main text is a scam address by the scam information detection model.

The second analysis unit 620 of the learning data acquisition apparatus 100 may execute Step 560 of acquiring, when a cryptocurrency address is a scam address, the cryptocurrency address as a second scam address. More specifically, when the information on whether the cryptocurrency address included in the main text is a scam address represents a scam address, the learning data acquisition apparatus 100 may acquire the cryptocurrency address included in the main text as a second scam address.

The learning data acquisition apparatus 100 may execute Step 570 of storing the second scam address in a second database 440. When the second scam address overlaps with the first scam address, the second database 440 may ignore any one of the second scam address and the first scam address, or update information about any one of the second scam address and the first scam address.

Figure 7:
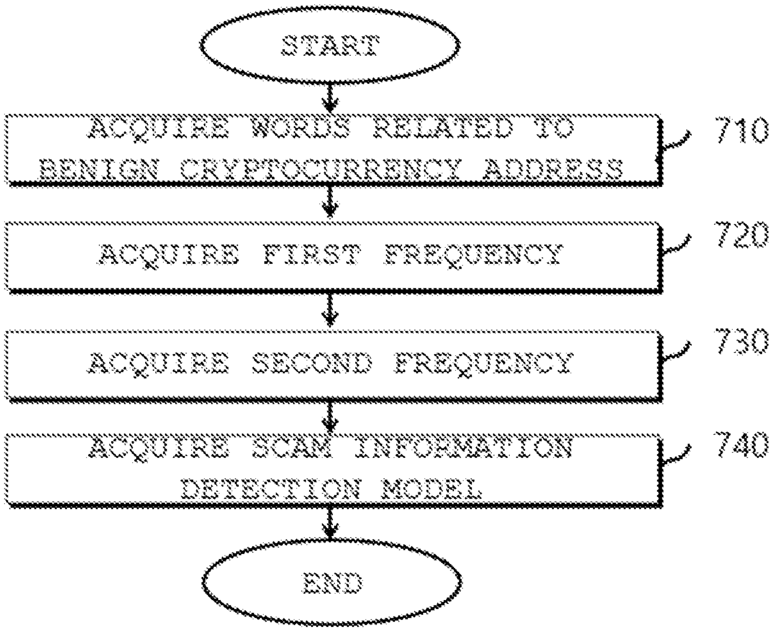
FIG. 7 is a flowchart illustrating a method for acquiring a scam information detection model according to an embodiment of the present disclosure.

FIG. 7 is a flowchart illustrating a method for acquiring a scam information detection model according to an embodiment of the present disclosure.

The learning data acquisition apparatus 100 may execute Step 710 of acquiring words related to a benign cryptocurrency address acquired from a website determined as including the benign cryptocurrency address. The benign cryptocurrency address may represent that it is not a cryptocurrency address owned by a scammer.

The website determined as including a benign cryptocurrency address may mean a website providing reliability information of a cryptocurrency address. Cryptocurrency users may leave a review related to cryptocurrency trading on a website after trading cryptocurrency. A user may represent a review by a score or text.

The user may determine a website including a benign cryptocurrency address. Alternatively, the learning data acquisition apparatus 100 may automatically determine a website including a benign cryptocurrency address. In addition, the learning data acquisition apparatus 100 may acquire words related to a benign cryptocurrency address from a website or webpage including the benign cryptocurrency address. For example, the learning data acquisition apparatus 100 may remove unnecessary characters from a website or webpage. The learning data acquisition apparatus 100 may acquire words related to a benign cryptocurrency address after removing unnecessary characters from a website or webpage. The words related to the benign cryptocurrency address may be keywords for explaining the benign cryptocurrency address.

The learning data acquisition apparatus 100 may execute Step 720 of acquiring a first frequency with which each of words related to a benign cryptocurrency address appears on the website 610. The learning data acquisition apparatus 100 may increase accuracy of the scam information detection model on the basis of the first frequency as well as the words related to the benign cryptocurrency address.

The learning data acquisition apparatus 100 may execute Step 730 of acquiring a second frequency with which the first keywords appear in a first description. The learning data acquisition apparatus 100 may acquire the first keywords from the first database 430. Since the process of acquiring the first keywords has been described with reference to FIG. 3 and FIG. 4, a redundant description is omitted.

The learning data acquisition apparatus 100 may execute Step 740 of acquiring the scam information detection model by machine learning of the words related to the benign cryptocurrency address labeled as benign, the first frequency, the second frequency, and the plurality of first keywords labeled as scam. The scam information detection model may learn information related to the benign addresses on the basis of the first frequency and the words related to the benign cryptocurrency address, and may learn information related to scam addresses on the basis of the second frequency and the plurality of first keywords.

The learning data acquisition apparatus 100 may transmit the scam information detection model to another learning data acquisition apparatus 100 by wire or wireless. The learning data acquisition apparatus 100 may store the scam information detection model in the memory 220.

The learning data acquisition apparatus 100 may acquire a new cryptocurrency address, second keywords corresponding to the new cryptocurrency address, and a frequency of the second keywords. The learning data acquisition apparatus 100 may determine whether the new cryptocurrency address is scam by applying the second keywords and the frequency of the second keywords.

The configuration in which the learning data acquisition apparatus 100 discerns scam address from the information described on the website using the scam information detection model has been described, but the invention is not limited thereto. The learning data acquisition apparatus 100 may discern the benign address from information described on the website using the scam information detection model.

In addition, a method in which the learning data acquisition apparatus 100 acquires the scam information detection model is not limited to the method described above. After reviewing the website, the user may label a webpage with a scam address as 'scam' and store it with the scam address, and label a webpage with a benign address as 'benign' and store it with the benign address. The learning data acquisition apparatus 100 may acquire a scam information detection model by machine learning of the scam address, the webpage labeled as 'scam', the webpage labeled as 'benign', and the benign address. The learning data acquisition apparatus 100 may determine whether an address is related to a scammer from a webpage simply by applying the webpage to the scam information detection model.

Figure 8:
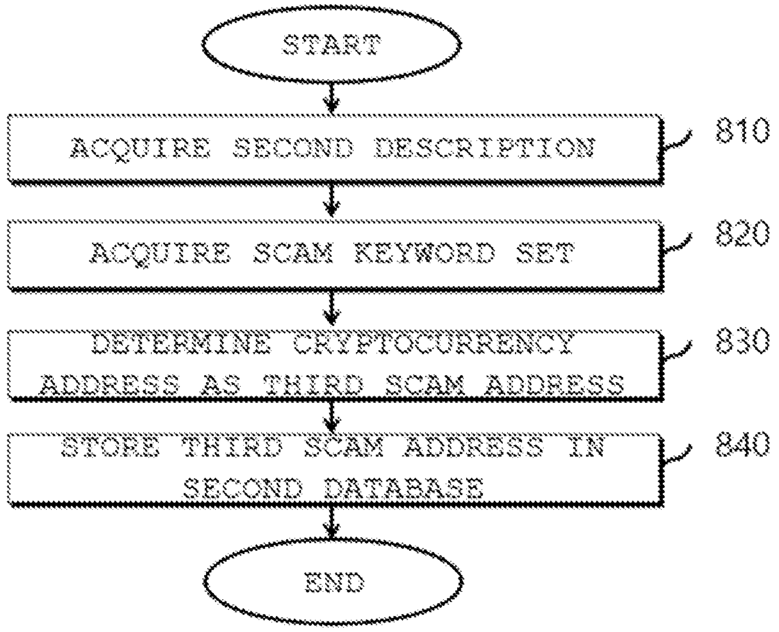
FIG. 8 is a flowchart illustrating an operation of a learning data acquisition apparatus according to an embodiment of the present disclosure.
Figure 10:
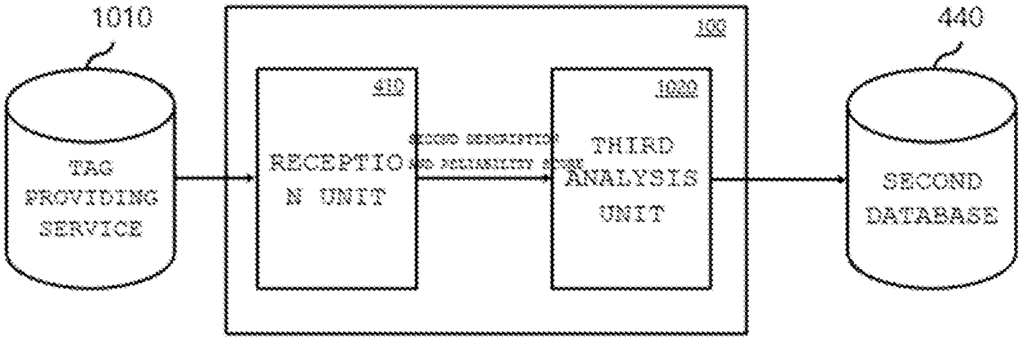
FIG. 10 is a diagram illustrating an operation of a learning data acquisition apparatus according to an embodiment of the present disclosure.

FIG. 8 is a flowchart illustrating an operation of a learning data acquisition apparatus according to an embodiment of the present disclosure. In addition, FIG. 10 is a diagram illustrating an operation of a learning data acquisition apparatus according to an embodiment of the present disclosure. 118

The learning data acquisition apparatus 100 may execute Step 810 of acquiring a second description from a service 1010 providing a tag corresponding to a cryptocurrency address. The learning data acquisition apparatus 100 may acquire the second description using a reception unit 410.

The tag may be meta information attached to a cryptocurrency address. The service providing a tag corresponding to a cryptocurrency address may be a site such as "blockchain.info", "Bitcointalk community", or "bitcoin-otc.com".

The tag may include Submitted link tag, Signed message tag, Bitcointalk profile tag, or Bitcoin-OTC profile tag (Bitcoin over-the-counter profile tag). The Submitted link tag provides a simple description of a cryptocurrency address to which a tag is designated. A reporting person sometimes provides a scam description together with a page link representing a source of scam information.

The Signed message tag provides an owner of an address. However, since the owner selects this identifier, a scammer may claim false ownership.

The Bitcointalk profile tag may provide only a user identifier in a cryptocurrency community.

The Bitcoin-OTC profile tag provides a user identifier in a Bitcoin-OTC website. Unlike Bitcoin talk, this website provides a reputation score for each user nickname. This score may be awarded by a counterparty who performed a financial transaction with respect to a target cryptocurrency address. In addition, it provides a brief description of why the counterparty assigned the given score to the given cryptocurrency address. Accordingly, it is possible to obtain all information related to scam addresses and benign addresses using the Bitcoin-OTC profile tag.

The second description may be acquired from the Signed message tag or Bitcoin-OTC profile tag. The second description may be text information of reputation related to a cryptocurrency address.

The learning data acquisition apparatus 100 may execute Step 820 of acquiring a scam keyword set on the basis of the plurality of first keywords.

The learning data acquisition apparatus 100 may further include a third analysis unit 1020. The third analysis unit 1020 may analyze the second description received from the service 1010 providing a tag. The third analysis unit 1020 may be implemented as software or hardware. The learning data acquisition apparatus 100 may acquire a scam keyword set from the first keywords using the third analysis unit 1020.

The learning data acquisition apparatus 100 may acquire the first keywords from the first database 430. Since the process of acquiring the first keywords has been described with reference to FIG. 3 and FIG. 4, a redundant description is omitted.

The scam keyword set may include only nouns. In addition, the learning data acquisition apparatus 100 may remove characters unnecessary for analysis among the first keywords. For example, the learning data acquisition apparatus 100 may delete terms related to Twitter, Tumblr, and Instagram not related to scam among the first keywords.

The learning data acquisition apparatus 100 may execute acquiring a frequency with which each of the plurality of first keywords appears in the first description. The learning data acquisition apparatus 100 may execute determining a predetermined number of words with a high frequency among the plurality of first keywords as a scam keyword set. For example, the learning data acquisition apparatus 100 may acquire a scam keyword set by selecting 11 words with the highest frequency among the first keywords.

The learning data acquisition apparatus 100 may execute Step 830 of determining, when the words included in the scam keyword set is described in the second description, a cryptocurrency address corresponding to the second description as a third scam address. Since the number of words included in the tag is not large, the learning data acquisition apparatus 100 may determine whether the tag represents scam on the basis of the scam keywords derived from the first keywords.

The learning data acquisition apparatus 100 may further use the frequency on the first description of the words included in the scam keyword set. For example, even if the second description includes a word of the scam keyword set, when the word is not a word that appears frequently in the second description, the learning data acquisition apparatus 100 may not determine a cryptocurrency address corresponding to the second description as the third scam address. In addition, when the second description includes a word of the scam keyword set and the word is a word that appears frequently in the second description, the learning data acquisition apparatus 100 may determine a cryptocurrency address corresponding to the second description as the third scam address.

The learning data acquisition apparatus 100 may execute Step 840 of storing the third scam address in the second database 440. When the third scam address overlaps the first scam address or the second scam address, the second data base 440 may ignore any one of the third scam address, the first scam address, or the second scam address, or update information about any one of the third scam address, the first scam address, or the second scam address.

Figure 9:
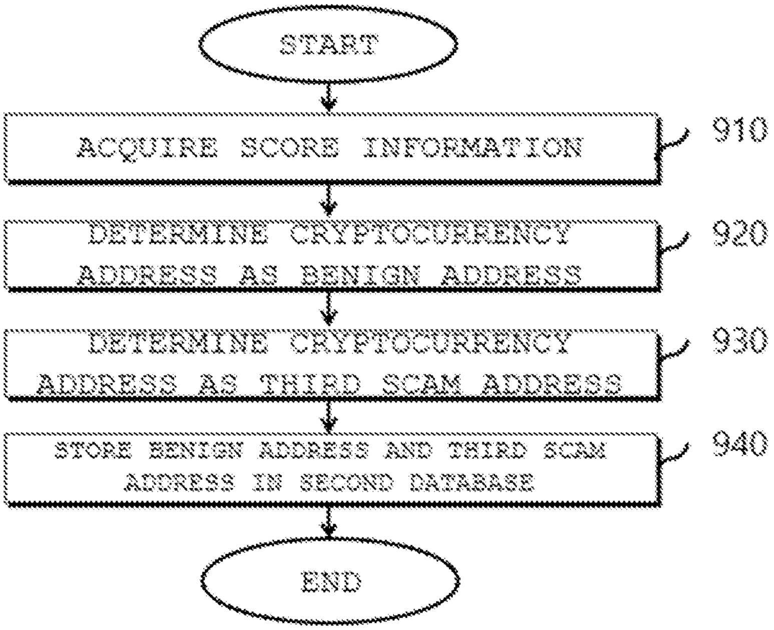
FIG. 9 is a flowchart illustrating an operation of a learning data acquisition apparatus according to an embodiment of the present disclosure.

FIG. 9 is a flowchart illustrating an operation of a learning data acquisition apparatus according to an embodiment of the present disclosure.

In FIG. 8, the case in which the learning data acquisition apparatus 100 acquires the second description from the service 1010 providing a tag has been described. FIG. 9 illustrates a case of acquiring reliability score information of a cryptocurrency address as well as the second description.

The learning data acquisition apparatus 100 may execute Step 910 of acquiring score information representing reliability of an address from a service providing a tag corresponding to a cryptocurrency address. The score information representing reliability of an address may be a score left by a counterparty who transacted with a cryptocurrency address. In addition, when a plurality of transaction counterparties leaves scores, an average of the score may be score information representing reliability of an address.

The learning data acquisition apparatus 100 may execute Step 920 of determining, when the score information represents benign and the second description does not include a word included in the scam keyword set, a cryptocurrency address as a benign address. When the score information is equal to or more than a threshold value, the learning data acquisition apparatus 100 may determine the address as benign. However, the invention is not limited thereto, and when the score information is equal to or less than a threshold value, the learning data acquisition apparatus 100 may determine it as benign.

The learning data acquisition apparatus 100 may execute Step 930 of determining, when the score information represents scam and the second description includes a word included in the scam keyword set, the cryptocurrency address as a third scam address. When the score information is equal to or less than a threshold value, the learning data acquisition apparatus 100 may determine it as scam. However, the invention is not limited thereto, and when the score information is equal to or more than a threshold value, the learning data acquisition apparatus 100 may determine it as scam.

When the score information represents scam but the second description does not include a word included in the scam keyword set, or when the score information represents benign but the second description includes a word included in the scam keyword set, the learning data acquisition apparatus 100 may withhold decision on the cryptocurrency address. Since the learning data acquisition apparatus 100 determines a cryptocurrency address as a benign address or a scam address only when a case is certain, it is possible to perform machine learning on the basis of reliable data later.

The learning data acquisition apparatus 100 may execute Step 940 of storing a benign address and a third scam address in the second database 440. When the third scam address overlaps with the first scam address or the second scam address, the second database 440 may ignore any one of the third scam address, the first scam address, or the second scam address, or update information about any one of the third scam address, the first scam address, or the second scam address.

Figure 11:
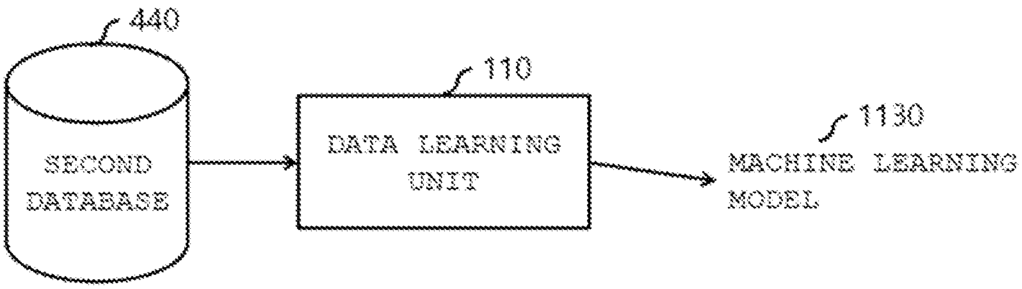
FIG. 11 is a diagram illustrating a configuration of deriving a machine learning model according to an embodiment of the present disclosure.

FIG. 11 is a diagram illustrating a configuration of deriving a machine learning model according to an embodiment of the present disclosure.

So far, the method in which the learning data acquisition apparatus 100 derives the first scam address, the second scam address, the third scam address, and the benign address and stores them in the second database 440 has been described. The data learning unit 110 may perform machine learning on the basis of data stored in the second database 440 and derive a machine learning model 1130.

The data learning unit 110 may use not only the first scam address, the second scam address, the third scam address, and the benign address, but also information related to the first scam address, the second scam address, the third scam address, and the benign address. The information related to the first scam address, the second scam address, the third scam address, and the benign address may include a transaction history. The transaction history may include transaction date and time, an address of transaction counterparty, or size of transaction amount.

The data learning unit 110 may acquire features of addresses by analyzing the information related to the first scam address, the second scam address, the third scam address, and the benign address. The data learning unit 110 may perform machine learning using the features of addresses and generate the machine learning model 1130.

The data learning unit 110 may store the generated machine learning model 1130 in a memory or transmit it to another device. The data recognition unit 120 may determine whether a cryptocurrency address is a scam address on the basis of the machine learning model 1130. The data recognition unit 120 may determine whether a cryptocurrency address is a scam address by receiving a new cryptocurrency address and applying the new cryptocurrency address to the machine learning model 1130.

So far, various embodiments have been mainly described. Those of ordinary skill in the art to which the present invention pertains will understand that the present invention can be implemented in a modified form without departing from the essential characteristics of the present invention. Therefore, the disclosed embodiments are to be considered in an illustrative rather than a restrictive sense. The scope of the present invention is indicated in the claims rather than the foregoing description, and all differences within the scope equivalent thereto should be construed as being included in the present invention.

Meanwhile, the above-described embodiments of the present invention can be written as a program that can be executed on a computer, and can be implemented in a general-purpose digital computer that operates the program using a computer-readable recording medium. The computer-readable recording medium includes a storage medium such as a magnetic storage medium (e.g., ROM, floppy disk, hard disk, etc.) and an optically readable medium (e.g., CD-ROM, DVD, etc.).

The invention claimed is:

1. A learning data acquisition method for acquiring learning data to generate a machine learning model for detecting a scam account of cryptocurrency in a learning data acquisition apparatus, the method comprising:

receiving a report related to a scam address included in a first database having information about a reported scam address stored therein from a service provider for providing information related to scam addresses of cryptocurrency;

acquiring a first scam address and a first description related to the first scam address from the report, wherein the first scam address is an address determined as a cryptocurrency address used for scam by the service provider;

extracting a plurality of first keywords related to the first scam address from the first description using natural language processing, wherein the extracting of the plurality of first keywords includes removing characters unnecessary for analysis from the first description, including numbers, URLs, and stop words, and based on a number of words remaining in the first description after the unnecessary characters being removed from the first description being equal to or greater than a predetermined number, without limiting a length of each of the words remaining in the first description, using the words of remaining in the first description as the plurality of first keywords related to the first scam address, and wherein, based on the number of remaining words in the first description being less than the predetermined number, the first description is not used for obtaining keywords related to the first scam address;

storing the first scam address in a second database;

receiving text information from a publicly accessible website not provided by the service provider for providing information related to scam addresses of cryptocurrency;

analyzing, by a hardware processor of the learning data acquisition apparatus, the received text information and extracting, by the hardware processor, main text information including a cryptocurrency address from the text information;

extracting, by the hardware processor, a plurality of second keywords from the main text information using natural language processing;

acquiring, by the hardware processor, a scam information detection model which is a machine learning model for determining whether a cryptocurrency address is used by a scammer based on keywords related to an address of cryptocurrency;

determining, by the hardware processor, whether or not the cryptocurrency address included in the main text information is a scam address by applying the plurality of second keywords to the scam information detection model, wherein the determining of whether or not the cryptocurrency address included in the main text information is the scam address comprises (i) deriving a frequency with which each of the plurality of second keywords extracted from the main text information appears in the main text information, and (ii) applying the plurality of second keywords extracted from the main text information and the frequency to the scam information detection model;

acquiring, by the hardware processor, when the cryptocurrency address included in the main text information is a scam address, the cryptocurrency address included in the main text information as a second scam address; and storing the second scam address in the second database, wherein the step of acquiring the scam information detection model comprises:

acquiring words related to a benign cryptocurrency address from a website determined as including the benign cryptocurrency address, the words related to the benign cryptocurrency address being keywords for explaining the benign cryptocurrency address, wherein the website determined as including the benign cryptocurrency address is different from the publicly accessible website and is not provided by the service provider for providing information related to scam addresses of cryptocurrency, acquiring a first frequency with which each of the words related to the benign cryptocurrency address appears on the website determined as including the benign cryptocurrency address, acquiring a second frequency with which each of the plurality of first keywords related to the first scam address appears in the first description related to the first scam address, and acquiring the scam information detection model by machine learning of (i) the words related to the benign cryptocurrency address labeled as benign, (ii) the first frequency, (iii) the second frequency, and (iv) the plurality of first keywords labeled as scam.

2. The learning data acquisition method according to claim 1, further comprising:

acquiring a second description from a service providing a tag corresponding to a cryptocurrency address;

acquiring a scam keyword set on the basis of the plurality of first keywords;

determining, when a word included in the scam keyword set is described in the second description, a cryptocurrency address corresponding to the second description as a third scam address; and storing the third scam address in the second database.

3. The learning data acquisition method according to claim 2, wherein the step of acquiring the scam keyword set comprises:

acquiring a frequency of appearance in the first description for each of the plurality of first keywords; and determining a predetermined number of words with a high frequency among the plurality of first keywords as the scam keyword set.

4. The learning data acquisition method according to claim 2, further comprising:

acquiring score information representing reliability of an address from a service providing a tag corresponding to the cryptocurrency address;

determining the cryptocurrency address as a benign address, when the score information represents benign and a word included in the scam keyword set is not included in the second description;

determining the cryptocurrency address as the third scam address, when the score information represents scam and a word included in the scam keyword set is included in the second description; and storing the benign address and the third scam address in the second database.

5. A learning data acquisition apparatus for acquiring learning data to generate a machine learning model for detecting a scam account of cryptocurrency, including a hardware processor and a memory, wherein, according to commands stored in the memory, the hardware processor executes:

receiving a report related to a scam address included in a first database having information about a reported scam address stored therein from a service provider for providing information related to scam addresses of cryptocurrency;

acquiring a first scam address and a first description related to the first scam address from the report, wherein the first scam address is an address determined as a cryptocurrency address used for scam by the service provider;

extracting a plurality of first keywords related to the first scam address from the first description using natural language processing, wherein the extracting of the plurality of first keywords includes removing characters unnecessary for analysis from the first description, including numbers, URLs, and stop words, and based on a number of words remaining in the first description after the unnecessary characters being removed from the first description being equal to or greater than a predetermined number, without limiting a length of each of the words remaining in the first description, using the words remaining in the first description as the plurality of first keywords related to the first scam address, and wherein, based on the number of remaining words in the first description being less than the predetermined number, the first description is not used for obtaining keywords related to the first scam address;

storing the first scam address in a second database;

receiving text information from a publicly accessible website not provided by the service provider for providing information related to scam addresses of cryptocurrency;

analyzing the received text information and extracting main text information including a cryptocurrency address from the text information;

extracting a plurality of second keywords from the main text information using natural language processing;

acquiring a scam information detection model which is a machine learning model for determining whether a cryptocurrency address is used by a scammer based on keywords related to an address of cryptocurrency;

determining whether or not the cryptocurrency address included in the main text information is a scam address by applying the plurality of second keywords to the scam information detection model, wherein the determining of whether or not the cryptocurrency address included in the main text information is the scam address comprises (i) deriving a frequency with which each of the plurality of second keywords extracted from the main text information appears in the main text information, and (ii) applying the plurality of second keywords extracted from the main text information and the frequency to the scam information detection model;

acquiring, when the cryptocurrency address included in the main text information is a scam address, the cryptocurrency address included in the main text information as a second scam address; and storing the second scam address in the second database, wherein the acquiring of the scam information detection model comprises:

acquiring words related to a benign cryptocurrency address from a website determined as including the benign cryptocurrency address, the words related to the benign cryptocurrency address being keywords for explaining the benign cryptocurrency address, wherein the website determined as including the benign cryptocurrency address is different from the publicly accessible website and is not provided by the service provider for providing information related to scam addresses of cryptocurrency, acquiring a first frequency with which each of the words related to the benign cryptocurrency address appears on the website determined as including the benign cryptocurrency address, acquiring a second frequency with which each of the plurality of first keywords related to the first scam address appears in the first description related to the first scam address, and acquiring the scam information detection model by machine learning of (i) the words related to the benign cryptocurrency address labeled as benign, (ii) the first frequency, (iii) the second frequency, and (iv) the plurality of first keywords labeled as scam.

6. The learning data acquisition apparatus according to claim 5, wherein, according to commands stored in the memory, the processor executes:

acquiring a second description from a service providing a tag corresponding to a cryptocurrency address;

acquiring a scam keyword set on the basis of the plurality of first keywords;

determining, when a word included in the scam keyword set is described in the second description, a cryptocurrency address corresponding to the second description as a third scam address; and storing the third scam address in the second database.

7. The learning data acquisition apparatus according to claim 6, wherein, according to commands stored in the memory, the processor executes:

acquiring a frequency of appearance in the first description for each of the plurality of first keywords; and determining a predetermined number of words with a high frequency among the plurality of first keywords as the scam keyword set.

8. The learning data acquisition apparatus according to claim 6, wherein, according to commands stored in the memory, the processor further executes:

acquiring score information representing reliability of an address from a service providing a tag corresponding to the cryptocurrency address;

determining the cryptocurrency address as a benign address, when the score information represents benign and a word included in the scam keyword set is not included in the second description;

determining the cryptocurrency address as the third scam address, when the score information represents scam and a word included in the scam keyword set is included in the second description; and storing the benign address and the third scam address in the second database.

* * * * *